United States Patent [19]

Gillie

[11] E Re. 31,435

[45] Reissued Nov. 1, 1983

[54] TELESCOPIC CARTON ASSEMBLY

[75] Inventor: Raymond A. Gillie, Walnut Creek, Calif.

[73] Assignee: Arvey Corporation, Chicago, Ill.

[21] Appl. No.: 431,825

[22] Filed: Sep. 30, 1982

Related U.S. Patent Documents

Reissue of:

[64] Patent No.: 4,323,187
Issued: Apr. 6, 1982
Appl. No.: 896,797
Filed: Apr. 17, 1978

[51] Int. Cl.[3] ..... B65D 5/22; B65D 5/30; B65D 5/68

[52] U.S. Cl. ..... 229/34 R; 229/23 BT

[58] Field of Search ..... 229/23 BT, 33, 34 R, 229/36, 44 R, 43; 206/45.2, 44.19

[56] References Cited

U.S. PATENT DOCUMENTS

| | | | |
|---|---|---|---|
| 502,952 | 8/1893 | Craw | 229/34 R |
| 1,125,902 | 1/1915 | Downey et al. | 229/34 R |
| 1,129,061 | 12/1915 | Binckley | 229/33 |
| 1,609,186 | 11/1926 | Peruzzi | 229/34 R |
| 1,732,436 | 10/1929 | Floto | 229/33 |
| 1,941,084 | 12/1933 | Gross | 229/34 R |
| 2,014,695 | 9/1935 | Peterson | 229/34 R |
| 2,270,580 | 1/1942 | Christy | 229/36 |
| 2,758,781 | 8/1955 | White | 229/45 R |
| 3,001,685 | 9/1961 | Blount | 229/34 R |
| 3,076,589 | 2/1963 | Meijdam | 229/34 R |
| 3,139,228 | 6/1964 | Wilkins | 229/34 R |
| 3,162,350 | 12/1964 | Miller | 229/34 R |
| 3,203,613 | 8/1965 | Stowe | 229/16 R |
| 3,459,297 | 8/1969 | Templeton | 206/449 |
| 3,581,975 | 6/1971 | Riccio | 229/33 |
| 3,743,170 | 7/1973 | Riccio | 229/33 |
| 3,801,000 | 4/1974 | Hurley | 229/23 R |
| 3,826,420 | 7/1974 | Bamburg | 229/36 |
| 3,889,868 | 6/1975 | Bruckner et al. | 229/34 R |
| 4,196,843 | 4/1980 | Garmon | 229/34 R |

FOREIGN PATENT DOCUMENTS

| | | | |
|---|---|---|---|
| 80738 | 3/1956 | Denmark | 229/34 R |

*Primary Examiner*—Herbert F. Ross
*Attorney, Agent, or Firm*—Dressler, Goldsmith, Shore, Sutker & Milnamow, Ltd.

[57] ABSTRACT

A telescopic carton assembly for compact shipment and storage of envelopes and the like which is readily converted and separated into two self-contained shipping containers with about twice the load-carrying capacity of the telescopic carton assembly. The convertible carton assembly is particularly useful in connection with pre-sorted mail and includes a pair of telescoping cartons. Each of the cartons has an outer panel with upright walls and a movable flap assembly for converting the carton from a portion of the telescopic carton assembly to a self-contained shipping container. Preferably, the movable flap assembly includes a movable panel and a pair of pivotable flaps. The movable panel and one of the flaps are positioned adjacent the outer panel within the interior of the carton when the carton is being used as part of the telescopic carton assembly. The other pivotable flap cooperates with the movable panel to provide the top of the carton when the carton is separated from telescopic engagement with the other carton during use of the carton as a self-contained shipping container.

17 Claims, 6 Drawing Figures

TELESCOPIC CARTON ASSEMBLY

Matter enclosed in heavy brackets [ ] appears in the original patent but forms no part of this reissue specification; matter printed in italics indicates the additions made by reissue.

BACKGROUND OF THE INVENTION

This invention relates to cartons, and more particularly, to a carton assembly for use in connection with the shipment of pre-sorted mail and the like.

Pre-sorted mail and bulk mail are mutually advantageous for the postal service and the sender. The postal service can handle pre-sorted mail and bulk mail more efficiently and expeditiously than mail which has not been pre-sorted and grouped. This results in considerable economic savings to the postal service. To encourage the use of pre-sorted mail, the postal service currently gives a one or two penny discount in the price of postage per pre-sorted envelope to the economic advantage of the sender.

Usually senders obtain boxes of envelopes for subsequent stuffing from an envelope manufacturer, distributor or supplier. Some of the boxes have top and bottom portions which when separated provide two open top trays in which the envelopes can be removed and stuffed with the material to be mailed.

After the envelopes have been stuffed, the envelopes are often put into different shipping containers for mailing and the original boxes disposed of. This practice is tedious and time consuming and often results in the loss of many man hours in transferring the stuffed envelopes from the original boxes to new shipping containers. Furthermore, this practice results in enormous waste of boxes to the economic detriment of the sender.

Sometimes, the stuffed envelopes are kept in open top trays and the trays are covered for mailing with separate sleeves or lids obtained from venders or from the postal service. The cost of purchasing these sleeves or lids tends to be very expensive for the sender and/or postal service, especially when voluminous amounts of pre-sorted mail are involved. Furthermore, it is often cumbersome and time consuming to attach the sleeve and lids to the trays.

It is therefore desirable to provide a telescopic carton assembly for delivery of unstuffed envelopes to the sender, which can be readily and easily converted into two self-contained shipping containers into which stuffed and pre-sorted mail can be shipped without purchase of auxiliary sleeves and lids.

SUMMARY OF THE INVENTION

An improved telescopic carton assembly is provided which is particularly useful in connection with the shipment and handling of pre-sorted mail. The carton assembly includes two symmetrical interiorly open cartons which telescopically engage each other for delivery of new unstuffed envelopes or other articles. When the cartons are telescopically separated from each other, they provide a pair of self-contained shipping containers into which stuffed and pre-sorted mail or the like can be shipped without the purchase of auxiliary sleeves or lids. Advantageously, the cartons when separated have about twice the load-carrying capacity of the cartons when telescoped into each other.

Each of the cartons has an outer panel which is preferably rectangular. Each carton also has upright walls which are integrally hinged to and extend from the outer panel. Preferably, the upright walls include a pair of opposed longitudinal side flaps and a pair of opposed lateral end flaps.

In order to convert each carton from a telescoping carton into a separated self-contained shipping container, each carton is provided with a movable flap assembly. Desirably, the movable flap assembly has a movable panel and a pair of longitudinal pivotable flaps extending from opposite sides of the movable panel.

In the preferred form, one of the pivotable flaps is integrally hinged to one of the longitudinal side flaps and cooperates with the movable panel to provide the top of the separated self-contained shipping container. The other pivotable panel provides a closure flap for the separated self-contained shipping container and cooperates with the movable panel to provide an interior reinforcement section which is placed against the outer panel within the interior of the carton when the carton is being used as part of the telescopic assembly.

Preferably, each of the cartons can also be erected without the use of glue, gum tape, staples or other auxiliary fasteners. To this end a pair of longitudinally opposed auxiliary side flaps are integrally hinged to each of the longitudinal flaps, and a reinforcing flap is integrally hinged to each of the lateral end flaps. When assembled, the reinforcing flaps are positioned adjacent the lateral end flaps to form pockets for snugly receiving the auxiliary side flaps. This construction provides a generally rigid connection between the longitudinal side flaps and the lateral end flaps. Desirably, each of the reinforcing flaps also has one or more tabs which interlockingly engage tab-receiving apertures or slots in the outer panel to firmly lock the upright walls in an erect position relative to the outer panel.

In the illustrative embodiment, the closure flap has a finger grippable arcuate portion along its outer edge to provide an arcuate access opening for ease of gripping and moving the closure flap.

A more detailed explanation of the invention is provided in the following description and appended claims taken in conjunction with the accompanying drawings.

DETAILED DESCRIPTION OF THE ILLUSTRATIVE EMBODIMENT

Figure 1:
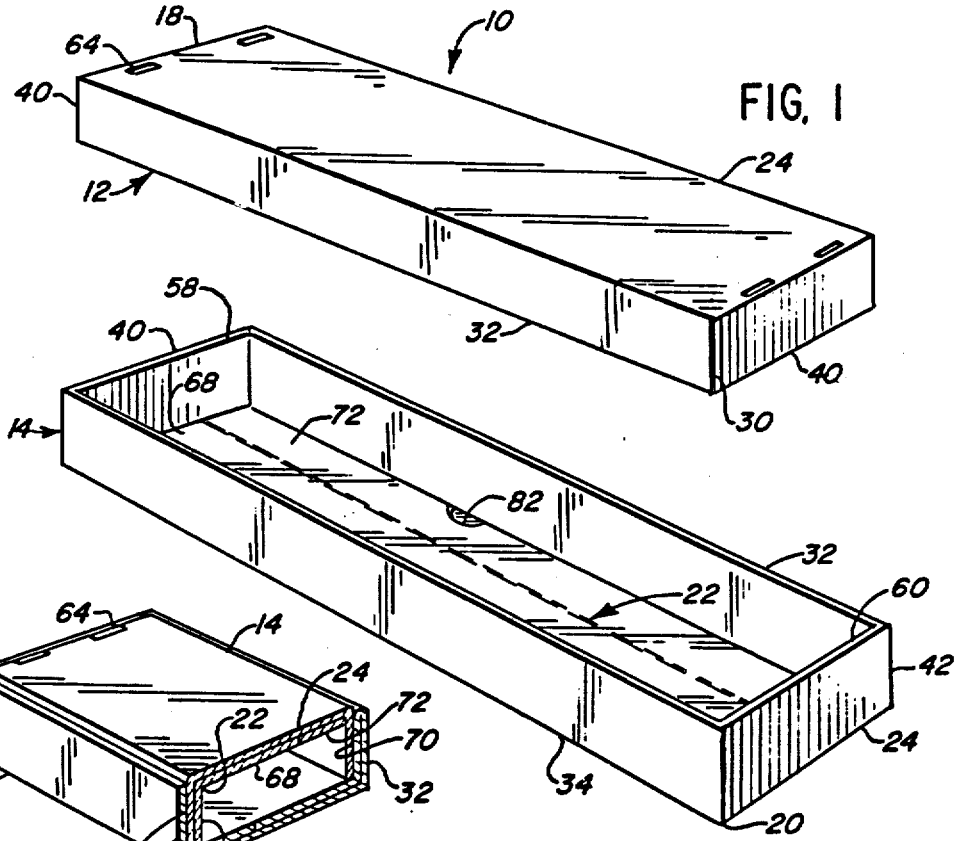
FIG. 1 is an exploded perspective view of a telescopic carton assembly in accordance with the principles of the present invention.
Figure 2:
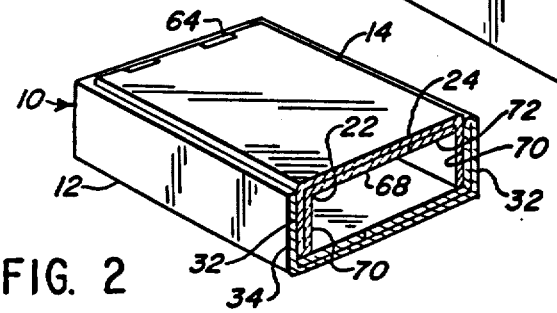
FIG. 2 is a fragmentary perspective view of a portion of the telescopic carton assembly illustrating portions of the upper and lower cartons in telescopic engagement with each other.
Figure 3:
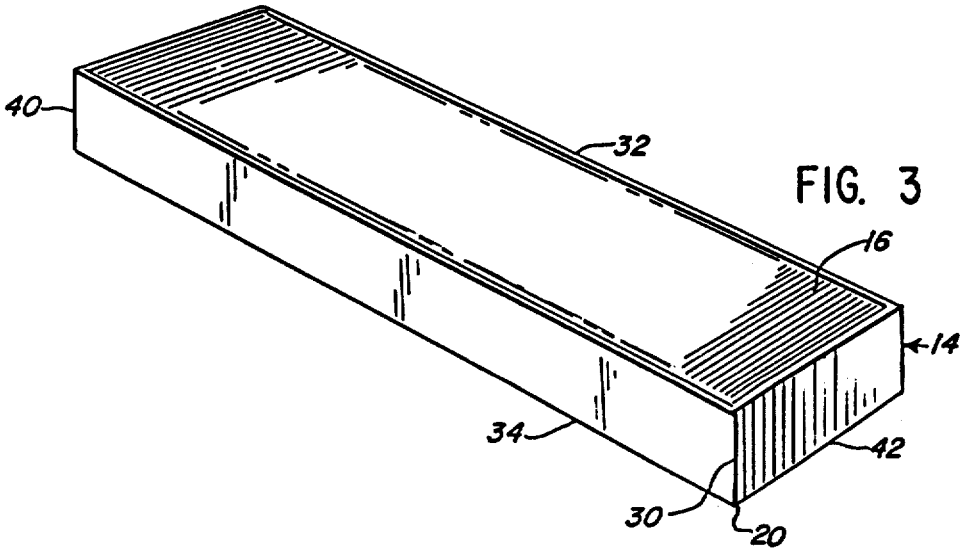
FIG. 3 is a perspective view of one of the cartons of the telescopic carton assembly packed with envelopes ready to be stuffed.

FIGS. 1-3 of the drawings illustrate a telescopic carton assembly 10 with an upper carton 12 and a lower carton 14. Upper and lower cartons 12 and 14 are generally symmetrical, complementary and structurally similar to each other. In the illustrative embodiment the upper carton 12 is of a slightly larger size than the lower carton 14 for telescopically receiving and covering the lower carton 14. In some circumstances, it may be desirable that the lower carton 14 be slightly larger in size than the upper carton 12 to telescopically receive and peripherally surround portions of the upper carton 12.

Telescopic carton assembly 10 is particularly useful for delivery of new, unused empty envelopes 16 (FIG. 3). Telescopic carton assembly 10 can also be useful for shipping other articles and materials.

When the envelopes 16 (FIG. 3) arrive at the pre-sorted mail sender in the closed telescopic carton assembly 10 (FIG. 2), the sender will open the carton assembly 10 and separate the cartons 12 and 14 so that the upper carton 12 is positioned upside down or inverted with its top 18 juxtapositioned closely adjacent the bottom 20 of the lower carton 14 to provide a pair of "open top" trays or compartments from which the envelopes 16 are removed for subsequent stuffing with material to be mailed.

As shown in FIG. 1, each of the cartons 12 and 14 has a movable flap assembly 22 which serves as an interior reinforcement section or portion for positioning against the inner surface of the outer panel 24 within the interior of the carton 12 and 14 so that the cartons 12 and 14 form a pair of interiorly open chambers which face each other when telescopically engaged into each other.

Figure 5:
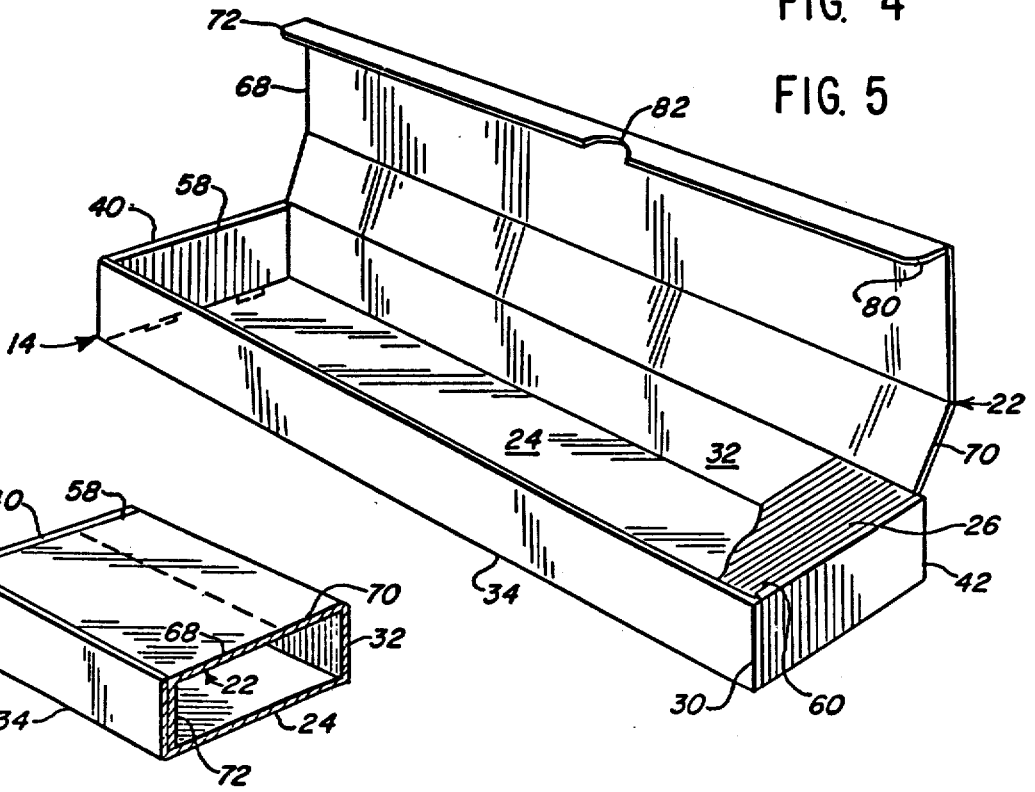
FIG. 5 is a perspective view of one of the cartons separated from the other carton with stuffed and pre-sorted mail therein and depicting the movable flap assembly of that carton in an open position prior to use of that carton as a self-contained shipping container.

After the new envelopes 16 have been removed, removable flap assembly 22 of each carton 12 or 14 is moved to an open position such as shown in FIG. 5 for placement, stuffing and sorting of the envelopes as pre-sorted mail 26. After the cartons 12 and 14 are filled with pre-sorted mail, the movable flap assembly 22 of each carton 12 and 14 is moved or pivoted to a closure position as shown in FIG. 6 to provide a pair of self-contained shipping containers for mailing and shipment of the pre-sorted mail 26.

Typically, the envelopes 26 (FIG. 5) after being stuffed with the material to be mailed occupy about twice the space of the unstuffed empty envelopes 16 (FIG. 3) delivered in the telescopic carton assembly 10 (FIGS. 1 and 2). Advantageously, the combined load-carrying capacity of the two separated self-contained shipping containers is about twice the load-carrying capacity of the cartons 12 and 14 when telescoped into each other.

Figure 6:
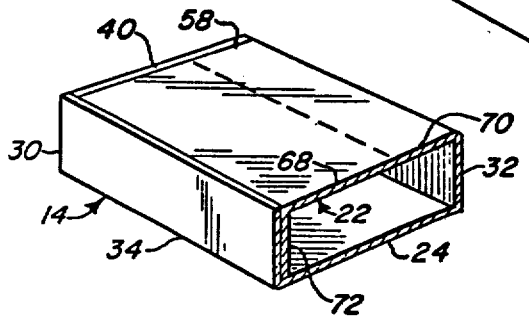
FIG. 6 is a fragmentary perspective view of portions of the self-contained shipping container as closed for mailing.

After the pre-sorted mail in the self-contained shipping containers (FIG. 6) have been mailed and the pre-sorted mail 26 removed, the cartons 12 and 14 can once again be telescopically inserted into each other to form a relatively compact telescopic carton assembly 10 (FIG. 2) which occupies about one-half the storage space of the separated cartons or self-contained shipping containers 12 and 14 (FIG. 6).

Each of the cartons 12 and 14 are made of corrugated cardboard. Preferably, each of the cartons 12 and 14 are also coated or impregnated with a liquid impervious material so that the cartons 12 and 14 will not generally weaken or decompose when exposed to rain or snow. In some circumstances it may be desirable that the cartons be made of other materials, such as paperboard or plastic.

In the illustrative embodiment, each of the cartons 12 and 14 is of a size and width to comfortably receive No. 10, standard letterhead or business envelopes 16 (FIG. 3). Other size cartons can also be used.

In detail, each of the cartons 12 and 14 has a generally rectangular outer panel 24 with generally upright walls 30. Outer panel 24 (FIG. 1) provides the top and bottom of cartons 12 and 14, respectively, when the cartons 12 and 14 are telescoped into each other.

Figure 4:
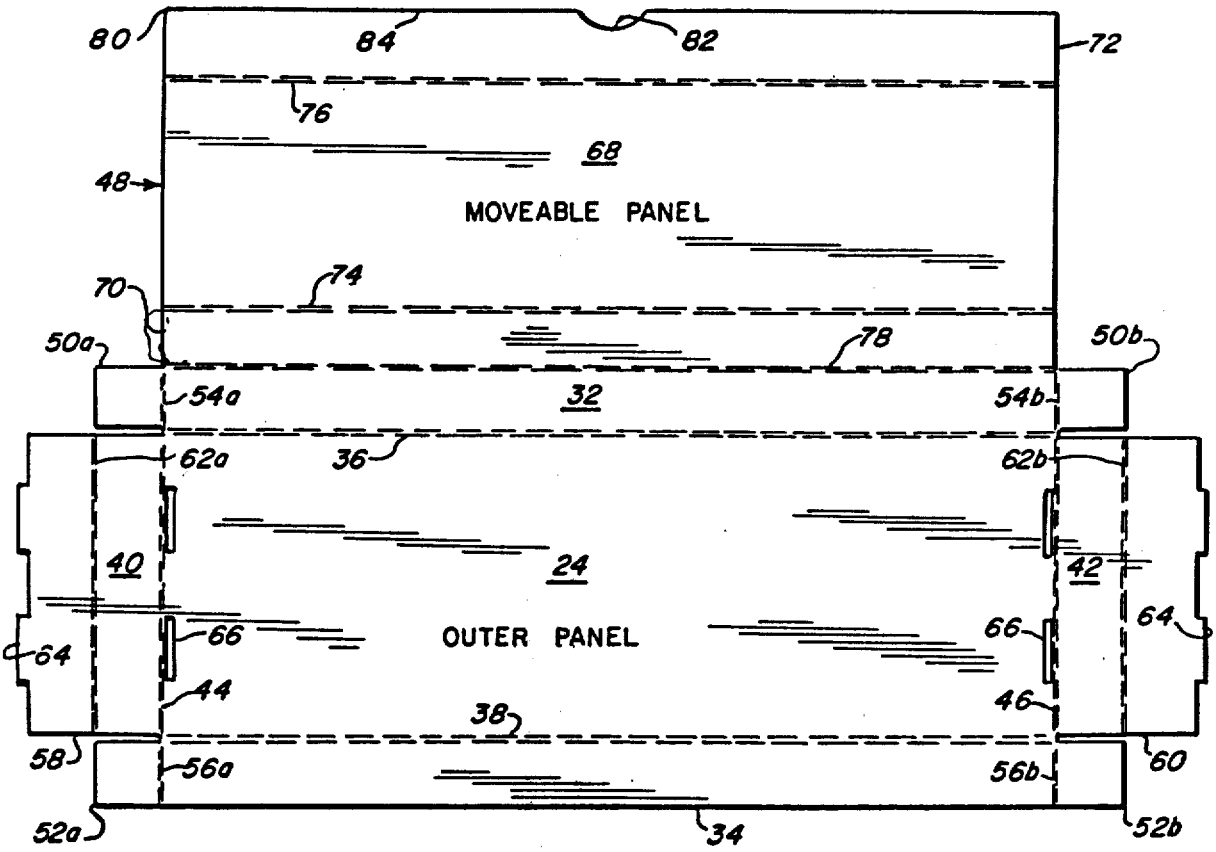
FIG. 4 is a top plan view of a blank or web from which the upper or lower carton is formed.

Upright walls 30 include a pair of laterally opposed, elongated, rectangular, longitudinal side flaps 32 and 34 (FIG. 4). One of the side flaps 32 provides a side panel which extends from and is integrally hinged to the outer panel 24 along a first longitudinal scoreline or longitudinal edge 36 and the other side flap 34 extends from and is integrally hinged to the outer panel 24 along a laterally opposite second longitudinal scoreline or longitudinal edge 38. Upright side walls 30 also have a pair of longitudinally opposed, elongated generally rectangular, lateral end flaps or panels 40 and 42 which are integrally hinged to and extend from the outer panel 24 along lateral scorelines or edges 44 and 46, respectively.

In order to securely erect the blank or web 48 (FIG. 4) into a generally rigid carton or container 12 and 14 without the use of glue, gum tape, staples or other auxiliary fasteners, the upright walls 32 have a pair of auxiliary interlocking side flaps 50a and 50b, and 52a and 52b, integrally hinged to and extending from longitudinal side flaps 32 and 34 along laterally opposite scorelines 54a, 54b, 56a and 56b, respectively. Upright walls 30 also have auxiliary inner reinforcement end flaps 58 and 60 extending from and integrally hinged to the ends of the lateral end flaps 40 and 42 along lateral scorelines 62a and 62b, respectively.

When assembled, the auxiliary end flaps 58 and 60 are positioned within the interior of the cartons 12 and 14 along the inwardly facing surfaces of the lateral end flaps 40 and 42, respectively, and face each other. Auxiliary end flaps 58 and 60 cooperate with the lateral end flaps 40 and 42 to define lateral, internal auxiliary side flap-receiving pockets which snugly receive auxiliary side flaps 50a, 50b, 52a and 52b to form a generally rigid connection between the longitudinal side walls 32 and 34 and the lateral end walls 40 and 42.

In order to securely attach and lock the upright walls 30 to the outer panel 24 without the use of auxiliary fasteners, such as staples, gum tape, etc., each of the auxiliary end flaps 58 and 60 has at least one and preferably two laterally spaced locking tabs 64 (FIG. 4). Outer panel 24 has a pair of aligned laterally opposed tab-receiving slots or apertures 66 positioned closely adjacent lateral scorelines 44 and 46, respectively. Tab-receiving slots 66 receive and interlockingly engage locking tabs 64.

In the illustrative embodiment tabs 64 are generally rectangular in shape and complementary in size to the tabs 64. Other shapes and configurations can be used if desired.

Each of the cartons 12 and 14 has a movable flap assembly 22 for converting the carton 12 or 14 from a portion of the telescopic carton assembly 10 (FIGS. 1 & 2) to a self-contained shipping container (FIG. 6) when telescopically separated from the other carton. As best shown in FIGS. 4 and 5, each movable flap assembly 22 has a generally rectangular movable panel 68 and a pair of elongated generally rectangular longitudinal pivotable flaps 70 and 72 extending along and integrally hinged to opposite longitudinal sides of the movable panel via longitudinal scorelines 74 and 76, respectively.

Pivotable flap 70, which is also referred to as the "inner pivotable flap" also extends from and is integrally hinged to longitudinal side flap 32 via longitudinal scorelines or edge 78 (FIG. 4). Preferably, inner pivotable flap 70 is generally of the same size and shape as longitudinal side flap 32 and is movable or pivotable to a side flap-engaging position bearing against the inner surface of longitudinal side flap 32 within the interior of the carton 12 or 14 for use of the carton 12 or 14 as part of the telescopic carton assembly 10 (FIGS. 1 & 2).

Inner pivotable flap 70 and movable panel 68 together are about the same size and shape as the outer panel 24 as viewed from the interior of the carton 12 or 14 and are movable together to a closure position as shown in FIG. 6 to provide the top of the carton 12 or 14 during use of the carton 12 or 14 as a separated self-contained shipping container (after the cartons 12 and 14 have been telescopically separated from each other).

The outer pivotable flap 72 is generally of the same size as the other longitudinal side flap 34 and provides a closure flap that can be moved or pivoted to a closure position as shown in FIG. 6 to bear against the inner surface of longitudinal side flap 34 during use of the carton 12 or 14 as a separated self-contained shipping container (after the cartons 12 and 14 have been telescopically separated from each other).

Outer pivotable flap 72 and movable panel 68 are movable or pivotable together to an outer panel-engaging position as shown in FIGS. 1 and 2 so as to bear against and engage the inner surface of outer panel 24 when the cartons 12 and 14 are being used as part of the telescopic carton assembly 10. Desirably, the outer pivotable flap 72 and the movable panel 68 together occupy about the same interior surface area as the outer panel 24.

In the preferred embodiment, the outer corners 80 (FIGS. 4 and 5) of the outer pivotable flap 72 are rounded to minimize frictional interference with the upright walls 30 of the carton 12 or 14 when the flap assembly 22 is being moved into and out of the closure and outer panel-engaging positions, respectively.

Preferably, outer pivotable flap 72 also has an arcuate finger-gripping section 82 (FIGS. 4 and 5) positioned generally midway along its outer edge 84. Arcuate finger-gripping section 82 defines an arcuate access opening to facilitate gripping of the outer pivotable flap 72. In the illustrative embodiment the arcuate section 82 is concave and preferably semi-circular in shape.

Although an embodiment of the invention has been shown and described, it is to be understood that various modifications and substitutions may be made by those skilled in the art without departing from the novel spirit and scope of the invention.

What is claimed is:

1. A telescopic carton assembly for use in connection with pre-sorted mail and the like, comprising:

a first carton;

a second carton for telescopically receiving and engaging said first carton;

one of said cartons providing the top part of said telescopic carton assembly and the other of said cartons providing the bottom part of said telescopic carton assembly;

each of said cartons having a generally rectangular outer panel defining a plurality of tab-receiving apertures, upright walls extending from said outer panel, said upright walls including a pair of elongated longitudinal side flaps integrally hinged to opposite sides of said outer panel, and a pair of lateral end flaps integrally hinged to opposite ends of said outer panel, said longitudinal side flaps and said lateral [side] *end* flaps being generally rectangular in shape, said upright walls further including pairs of longitudinally opposed auxiliary side flaps integrally hinged to said longitudinal side flaps, and auxiliary end flaps integrally hinged to said end flaps opposite said outer panel, said auxiliary side flaps and said auxiliary end flaps being generally rectangular in shape and said auxiliary end flaps being positioned adjacent said lateral end flaps within the interior of the carton to define lateral interior pockets for snugly receiving said auxiliary side flaps, each of said auxiliary end flaps having a pair of laterally opposed tabs for interlockingly engaging said tab-receiving apertures to permit said carton to be erected without the use of glue, staples, gum tape or other auxiliary fasteners, a first longitudinal pivotable flap integrally hinged to one of said longitudinal side flaps along an edge of said longitudinal side flap generally opposite said outer panel, said first pivotable flap being generally rectangular in shape and generally of the same size and shape as said longitudinal side flap and said first longitudinal pivotable flap being movable to a side flap engaging position bearing against said longitudinal side flap within the interior of said carton, a generally rectangular movable panel integrally hinged to said first pivotable flap along an edge of said first pivotable flap generally opposite said longitudinal side flap, said movable panel and said first pivotable flap together being about the same size as said outer panel, a second longitudinal pivotable flap integrally hinged to said movable panel along an edge of said movable panel generally opposite said first pivotable flap, said second pivotable flap and said movable flap being movable together to an outer panel-engaging position bearing against said outer panel within the interior of said carton and together occupying about the same interior surface area as said outer panel, said second pivotable flap having a concave finger-gripping portion defining an arcuate access opening generally midway along an outer edge of said second pivotable flap for facilitating gripping of said second pivotable flap, and said second pivotable flap having rounded corners for resisting interference with said upright walls during movement of said second pivotable flap, and each of said cartons being adapted to provide a separate self-contained shipping container when telescopically separated from the other carton with said first pivotable flap and said movable panel providing the top of said self-contained shipping container and said second pivotable flap providing a closure flap for said self-contained shipping container.

2. A telescopic carton assembly for use in connection with pre-sorted mail and the like, comprising:

a first carton;

a second carton for telescopically receiving said first carton;

one of said cartons providing the top part of said telescopic carton assembly and the other of said cartons providing the bottom part of said telescopic carton assembly;

each of said cartons having a generally rectangular outer panel, upright walls integrally hinged to and extending from said outer panel, said upright walls including a pair of longitudinally opposed elongated side flaps and a pair of laterally opposed end flaps, said side flaps and said end [flap] *flaps* being generally rectangular in shape, a first longitudinal pivotable flap integrally hinged to one of said longitudinal side flaps along an edge of said longitudinal flap generally opposite said outer panel, said first pivotable flap being generally rectangular and of about the same size and shape as said longitudinal side flap and said first pivotable flap being movable to a side flap-engaging position bearing against said longitudinal side flap within the interior of said carton, a generally rectangular movable panel integrally hinged to said first pivotable flap along an edge of said first pivotable flap generally opposite said longitudinal side flap, said movable panel and said first pivotable flap together being about the same size as said outer panel, a second longitudinal pivotable flap integrally hinged to said movable panel along an edge of said movable panel generally opposite said first pivotable flap, said second pivotable flap and said movable flap being movable together to an outer panel-engaging position bearing against said outer panel within the interior of said carton, and each of said cartons being adapted to provide a separate self-contained shipping container when separated from the other carton with said first pivotable flap and said movable panel providing the top of said self-contained shipping container and said second pivotable flap providing a closure flap for said self-contained shipping container.

3. A telescopic carton assembly in accordance with claim 2 wherein:

said outer panel defines tab-receiving apertures; and said upright walls include pairs of longitudinal opposed auxiliary side flaps integrally hinged to and extending from said longitudinal side flaps, said auxiliary side flaps being generally rectangular in shape, and auxiliary end flaps integrally hinged to and extending from said lateral end flaps generally opposite said outer panel, said auxiliary end flaps being positioned adjacent said longitudinal end flaps within the interior of said carton and defining interior auxiliary side flap-receiving pockets to snugly receive said auxiliary side flaps.

4. A telescopic carton assembly in accordance with claim 3 wherein:

each of said auxiliary end flaps has at least one tab; and said outer panel defines a plurality of tab-receiving apertures for receiving and interlockingly engaging said tabs to permit each of said cartons to be erected without the use of glue, staples, gum tape and other auxiliary fasteners.

5. A telescopic carton assembly in accordance with claim 4 wherein:

each of said auxiliary end flaps has a pair of laterally spaced tabs, and each of said tabs are generally U-shaped; and said tab-receiving apertures are generally rectangular.

6. A telescopic carton assembly in accordance with claim 2 wherein said second pivotable flap and said movable panel together occupy about the same surface area as said outer panel.

7. A telescopic carton assembly in accordance with claim 2 wherein said second pivotable flap has an arcuate finger-gripping portion for facilitating gripping of said second pivotable flap.

8. A telescopic carton assembly in accordance with claim 7 wherein said arcuate finger-gripping portion is concave and defines an arcuate access opening.

9. A telescopic carton assembly in accordance with claim 7 wherein said arcuate finger-gripping portion is generally semi-circular in shape and is positioned generally midway along an outer edge of said second pivotable flap.

10. A telescopic carton assembly in accordance with claim 2 wherein said second pivotable flap has rounded corners to help minimize frictional resistance with said upright walls during movement of said second pivotable flap.

*11. A carton forming a separate, self-contained, coverage shipping container which is adapted to be converted into part of a telescopic carton assembly, comprising:*

*an outer panel providing a bottom for said separate, self-contained, covered shipping container;*

*upright walls extending generally upwardly around said outer panel, and a movable flap assembly integrally hinged to and extending from one of said upright walls for converting said carton from use as a separate, self-contained, covered shipping container to use as part of a telescopic carton assembly;*

*said movable flap assembly including a movable panel and first and second pivotable flaps which are respectively integrally hinged to and extend along generally opposite edges of said movable panel;*

*said movable panel and said first pivotable flap together being about the same dimensions as said outer panel as viewed from the interior of the carton so as to define the top portion of said separate, self-contained, covered shipping container; and*

*said movable panel and said second pivotable flap having dimensions no greater than said outer panel and being movable together for engaging said outer panel within the interior of said carton so as to define an interior reinforcement section during use of said carton as part of said telescopic carton assembly.*

*12. A carton forming a separate, covered self-contained, shipping container which is adapted to be converted into part of a telescopic carton assembly, comprising:*

*a generally rectangular outer panel,*

*upright walls extending generally upwardly around said outer panel, said upright walls including a pair of longitudinally opposed elongated side flaps and a pair of laterally opposed end flaps, said side flaps and said end flaps being generally rectangular in shape,*

*a first longitidunal pivotable flap integrally hinged to one of said longitudinal side flaps along an edge of said longitudinal flap generally opposite said outer panel, said first pivotable flap being generally rectangular and of about the same size and shape as said*

*longitudinal side flap and said first pivotable flap being movable to a side flap-engaging position bearing against said longitudinal side flap within the interior of said carton,*

*a generally rectangular movable panel integrally hinged to said first pivotable flap along an edge of said first pivotable flap generally opposite said longitudinal side flap, said movable panel and said first pivotable flap together being about the same size as said outer panel, and*

*a second longitudinal pivotable flap integrally hinged to said movable panel along an edge of said movable panel generally opposite said first pivotable flap, said second pivotable flap and said movable flap being movable together to an outer panel-engaging position bearing against said outer panel within the interior of said carton, and*

*wherein said carton being adapted to provide a separate, self-contained, covered shipping container with said first pivotable flap and said movable panel providing the top portion of said separate self-contained, covered shipping container and said second pivotable flap defines a closure flap for said separate self-contained, covered shipping container.*

*13. A telescopic carton assembly, comprising:*

*a first carton;*

*a second carton slightly larger than said first carton for telescopically receiving and engaging said first carton;*

*one of said cartons providing the top part of said telescopic carton assembly and the other of said cartons providing the bottom part of said telescopic carton assembly; and*

*wherein each of said first and second cartons having an outer panel, upright walls extending generally upwardly around said outer panel, and means for converting said carton from a part of said telescopic carton assembly to a separate self-contained shipping container when said cartons are telescopically separated from each other; said converting means comprising a movable flap assembly including a movable panel and first and second pivotable flaps which are respectively integrally hinged to and extend along generally opposite edges of said movable panel; said movable panel and said first pivotable flap together being about the same dimensions as said outer panel as viewed from the interior of the carton so as to define the top of said separate self-contained shipping container; and said movable panel and said second pivotable flap having dimensions no greater than said outer panel and being movable together for engaging said outer panel within the interior of said carton so as to define an interior reinforcement section during use of said carton as part of said telescopic carton assembly.*

*14. A telescopic carton assembly for use in connection with pre-sorted mail and the like, comprising:*

*a first carton; a second carton for telescopically receiving said first carton;*

*one of said cartons providing the top part of said telescopic carton assembly and the other of said cartons providing the bottom part of said telescopic carton assembly;*

*wherein each of said first and second cartons having a generally rectangular outer panel, upright walls extending generally upwardly around said outer panel, said upright walls including a pair of longitudinally opposed elongated side flaps and a pair of laterally opposed end flaps, said side flaps and said end flaps being generally rectangular in shape, a first longitudinal pivotable flap integrally hinged to one of said longitudinal side flaps along an edge of said longitudinal flap generally opposite said outer panel, said first pivotable flap being generally rectangular and of about the same size and shape as said longitudinal side flap and said first pivotable flap being movable to a side flap-engaging position bearing against said longitudinal side flap within the interior of said carton, a substantially rigid, generally rectangular movable panel integrally hinged to said first pivotable flap generally opposite said longitudinal side flap, said movable panel having a size greater than the size of either side flap; said movable panel and said first pivotable flap together being about the same size as said outer panel, a second longitudinal pivotable flap integrally hinged to said movable panel along an edge of said movable panel generally opposite said first pivotable flap, said second pivotable flap and said movable flap being movable together to an outer panel-engaging position bearing against said outer panel within the interior of said carton; and*

*each of said cartons being adapted to provide a separate self-contained shipping container when separated from the other carton with said first pivotable flap and said movable panel providing the top of said self-contained shipping container and said second pivotable flap defines a closure flap for said self-contained shipping container.*

*15. The invention in accordance with claims 11 or 12 or 13 or 14 wherein said second pivotable flap and said movable panel together occupy about the same surface area as said outer panel.*

*16. The invention in accordance with claims 11, or 12 or 13 or 14 wherein said second pivotable flap has an arcuate finger-gripping portion for facilitating gripping of said second pivotable flap.*

*17. The invention in accordance with claims 13 or 14 wherein a plurality of envelopes are positioned within said first carton such that the width of said outer panel is generally equal to the length of said envelopes and the height of said upright walls are generally equal to the height of said envelopes.*

* * * * *